(12) United States Patent
Ravindranathan et al.

(10) Patent No.: US 12,217,770 B1
(45) Date of Patent: Feb. 4, 2025

(54) PLAYER SPOTLIGHT

(71) Applicant: Amazon Technologies, Inc., Seattle, WA (US)

(72) Inventors: Lokesh Amarnath Ravindranathan, Bangalore (IN); Kaustav Nandy, Bengaluru (IN); Manivel Sethu, Bangalore (IN); Yongjun Wu, Bellevue, WA (US); Imran Khan, Bangalore (IN); Shivam Agarwal, Agra (IN); Yash Pandya, Navi Mumbai (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/305,127

(22) Filed: Jun. 30, 2021

(51) Int. Cl.
| | |
|---|---|
| G11B 27/036 | (2006.01) |
| G06T 7/70 | (2017.01) |
| G06T 11/00 | (2006.01) |
| G06V 10/22 | (2022.01) |
| G06V 20/40 | (2022.01) |
| G06V 40/10 | (2022.01) |

(52) U.S. Cl.
CPC ............. *G11B 27/036* (2013.01); *G06T 7/70* (2017.01); *G06T 11/001* (2013.01); *G06V 10/225* (2022.01); *G06V 20/42* (2022.01); *G06V 40/10* (2022.01); *G06T 2207/10016* (2013.01); *G06T 2210/12* (2013.01)

(58) Field of Classification Search
CPC ....... G11B 27/036; G06T 7/70; G06T 11/001; G06T 2207/10016; G06T 2210/12; G06V 40/10; G06V 20/42; G06V 10/225
See application file for complete search history.

(56) References Cited

U.S. PATENT DOCUMENTS

| | | | | |
|---|---|---|---|---|
| 2009/0262137 | A1* | 10/2009 | Walker | H04H 60/04 |
| | | | | 345/629 |
| 2014/0169663 | A1 | 6/2014 | Han et al. | |
| 2016/0269615 | A1* | 9/2016 | Deng | G06T 7/38 |
| 2017/0154222 | A1* | 6/2017 | Zakaluk | G06T 7/277 |
| 2017/0178687 | A1* | 6/2017 | Tamir | G11B 27/036 |

(Continued)

OTHER PUBLICATIONS

U.S. Appl. No. 17/657,302, Inventors Nandy et al., filed Mar. 30, 2022.

(Continued)

*Primary Examiner* — Sunghyoun Park
(74) *Attorney, Agent, or Firm* — Weaver Austin Villeneuve & Sampson LLP

(57) ABSTRACT

Some implementations include methods generating visualization emphasis object for players and may include receiving a video clip associated with a sporting event participated by a plurality of players using a playing field with a play object. The players in a frame of the video clip may be detected. Players who are on the playing field may be identified from the detected players. Each of the players identified to be on the playing field may be associated with a rectangular bounding box that provides an outline of each of the players. A player who has possession of the play object may be identified. A visualization emphasis object may be generated and placed on the player who has possession of the play object. The visual emphasis object may have a size proportional to height of a bounding box associated with the player having the possession of the play object.

20 Claims, 7 Drawing Sheets

(56) References Cited

U.S. PATENT DOCUMENTS

| | | |
|---|---|---|
| 2017/0287135 A1 | 10/2017 | Pozos et al. |
| 2018/0061086 A1* | 3/2018 | Yoshimura ................ G06T 5/50 |
| 2018/0260960 A1* | 9/2018 | Crivelli ................... G06T 7/215 |
| 2019/0332893 A1 | 10/2019 | Roy Chowdhury et al. |
| 2020/0035019 A1* | 1/2020 | Cappello ................... G06T 7/75 |
| 2021/0142066 A1* | 5/2021 | Jayaram ................. G06V 20/42 |
| 2021/0168416 A1* | 6/2021 | Weiner ................. H04N 21/235 |
| 2022/0053245 A1* | 2/2022 | Guez ................. H04N 21/4126 |
| 2023/0033533 A1 | 2/2023 | Kaniyala et al. |

OTHER PUBLICATIONS

U.S. Non-Final Office Action dated May 22, 2024 in U.S. Appl. No. 17/657,302.

* cited by examiner

PLAYER SPOTLIGHT

BACKGROUND

When watching fast action sporting events which involve multiple players sharing a ball, it is sometimes difficult for the viewers to quickly identify a player who has possession of the ball. For live sporting events, commentary provided by commentators about which player has possession of the ball may help guide the viewers to the player to focus on. However, relying on the commentary may result in some delay and may affect the viewing experience. For recorded sporting events, manual editing may be performed offline to add visualization to the player having possession of the ball. This approach can be time consuming.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
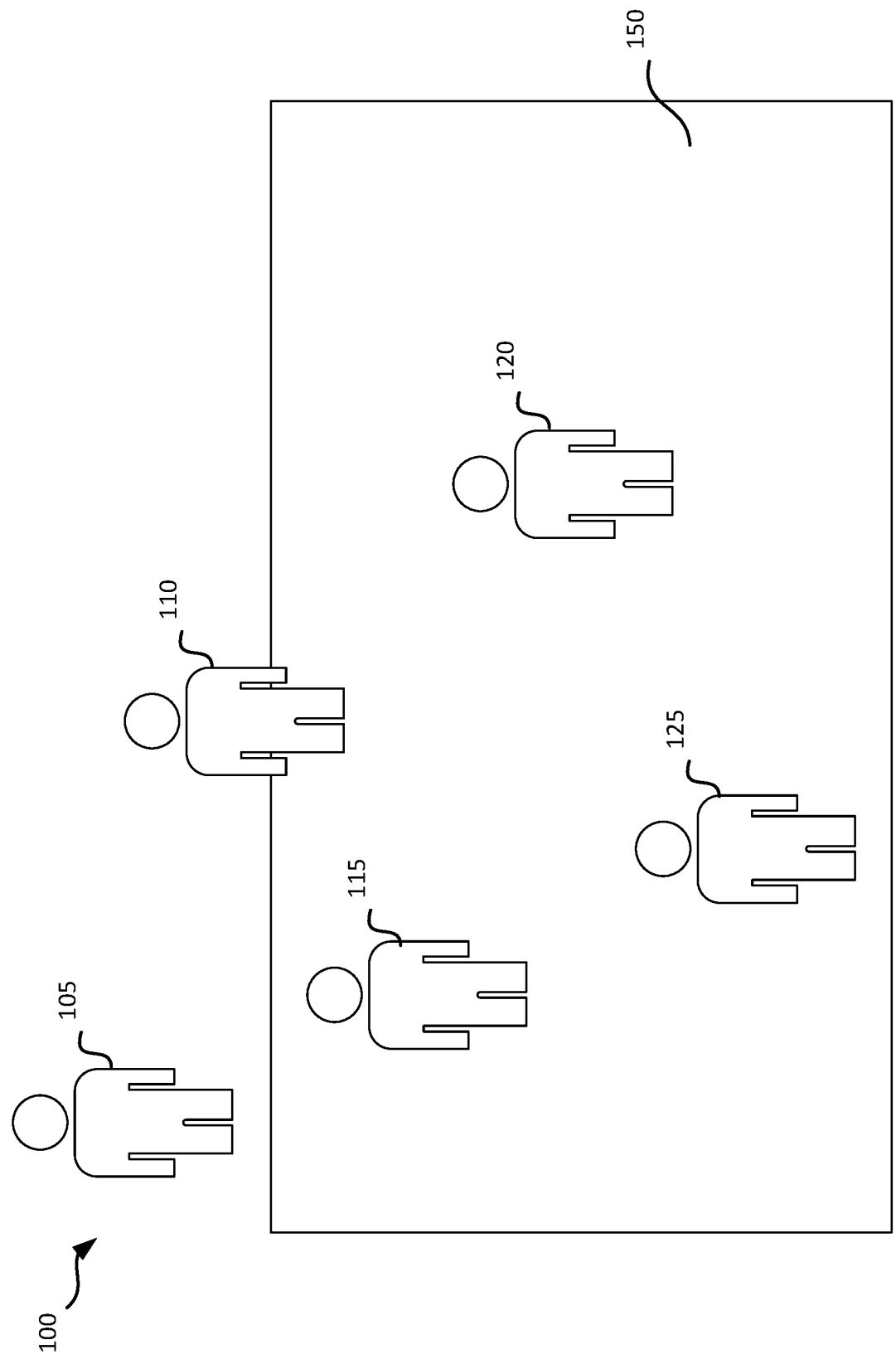
FIG. 1 shows an example frame that includes a playing field with multiple players, in accordance with some implementations.

This disclosure describes techniques for spotlighting or placing visualization emphasis objects on players in media presentation associated with sporting events. The media presentation may include a video component. The video component may be associated with a live streaming or a pre-recorded sporting event. The techniques may include receiving a video clip associated with the video component. The clip may include multiple frames. A frame may be analyzed to identify players in a playing field of the sporting event. The playing field may be identified based on identifying a field surface included in the frame using field surface segmentation. Visualization artifacts may include a visualization emphasis object that may be used to highlight a player of interest included in the frame.

Each of the players detected in the playing field may be associated with a bounding box. The bounding box may be a two-dimensional bounding box. A bounding box may outline a player of interest by its X and Y coordinates. The movement of each of the players in the playing field may be tracked from one frame to a next frame. Each player in the playing field may be associated with a tracking identification (ID).

A player with a play object such as a ball may be identified. A bounding box associated with the player with the play object may be identified. In some implementations, a visualization emphasis object may be generated for the player with the play object. The visualization emphasis object may be associated with a shape and a size. The shape of the visualization emphasis object may be an ellipse or any shape such as, for example, a circle, a star, a hexagon, or any outline or penumbra around the player or defined by the bounding box to draw attention of the viewers to one or more players. The size of the visualization emphasis object may vary depending on a height associated with a posture of the player with the play object or any player that viewers should focus on. The visualization emphasis object may be located at the center of the base of the bounding box of the player with the play object. When the possession of the play object is changed from a first player to a second player, the visualization emphasis object may be transferred from the first player to the second player. The visualization emphasis object may be updated to be associated with a tracking ID of the second player instead of the tracking ID of the first player.

An overlay frame corresponding to a frame from the video clip may be generated to reflect a location of the visualization emphasis object on a player with the play object. The overlay frame may be blended with the corresponding frame from the video clip to generate an updated video clip having the visualization emphasis feature. There may be many frames with blended visualization emphasis feature in the updated video clip. The updated video clip may be included in the media presentation and presented as a viewing option.

Examples of systems and methods associated with generating player visualization emphasis object associated with a media presentation will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

Detecting and tracking players in a playing field have many challenges. On any given video clip, there may be many players, and the players may be positioned very close to one another. This may make it difficult to track a player with the ball. Further, since the players may be wearing similar uniforms, there may be much visual ambiguity in distinguishing one player from the other players to keep track of the player with the ball. In addition, since the players in the playing field may move very quickly when the ball is in play, there may be motion blur making it difficult to track the player with the ball. To make it even more challenging, it's difficult to track the player with the ball when the ball is small and when the player with the ball may intentionally make the ball less visible using parts of the player's body.

FIG. 1 shows an example frame that includes a playing field with multiple players, in accordance with some implementations. In a sporting event, there may be multiple video cameras videoing the game from many different locations and at different angles. For example, there may be video cameras providing views of the playing field from the sides, and there may be video cameras providing views of the playing field from above. At any one time, the broadcasting team may select a view from one of the video cameras to be a prime view or a view that is visible to the viewers. For some implementations, the view of the playing field provided by the video camera selected by the broadcasting team may be used to perform player tracking. It may be possible that multiple views from multiple video cameras may be stitched to generate a stitched view. In the scenario where there is a stitched view, the stitched view may be used to perform player tracking.

It may be possible that a frame from a video clip may include many people including the players, the coaches and the spectators. There may be many players, and only some of the players may be on the playing field at any time. In some implementations, a player detection and tracking module 520 (shown in FIG. 5) may be used to analyze the frame 100 to detect the people included in the frame 100. Although not shown in FIG. 1, it's possible that the player detection and tracking module 520 may detect people in general in the frame 100, including players and non-players. The player detection and tracking module 520 may be configured to identify the players from the non-players based on, for example, gears or uniforms that are unique only to the players.

Figure 2:
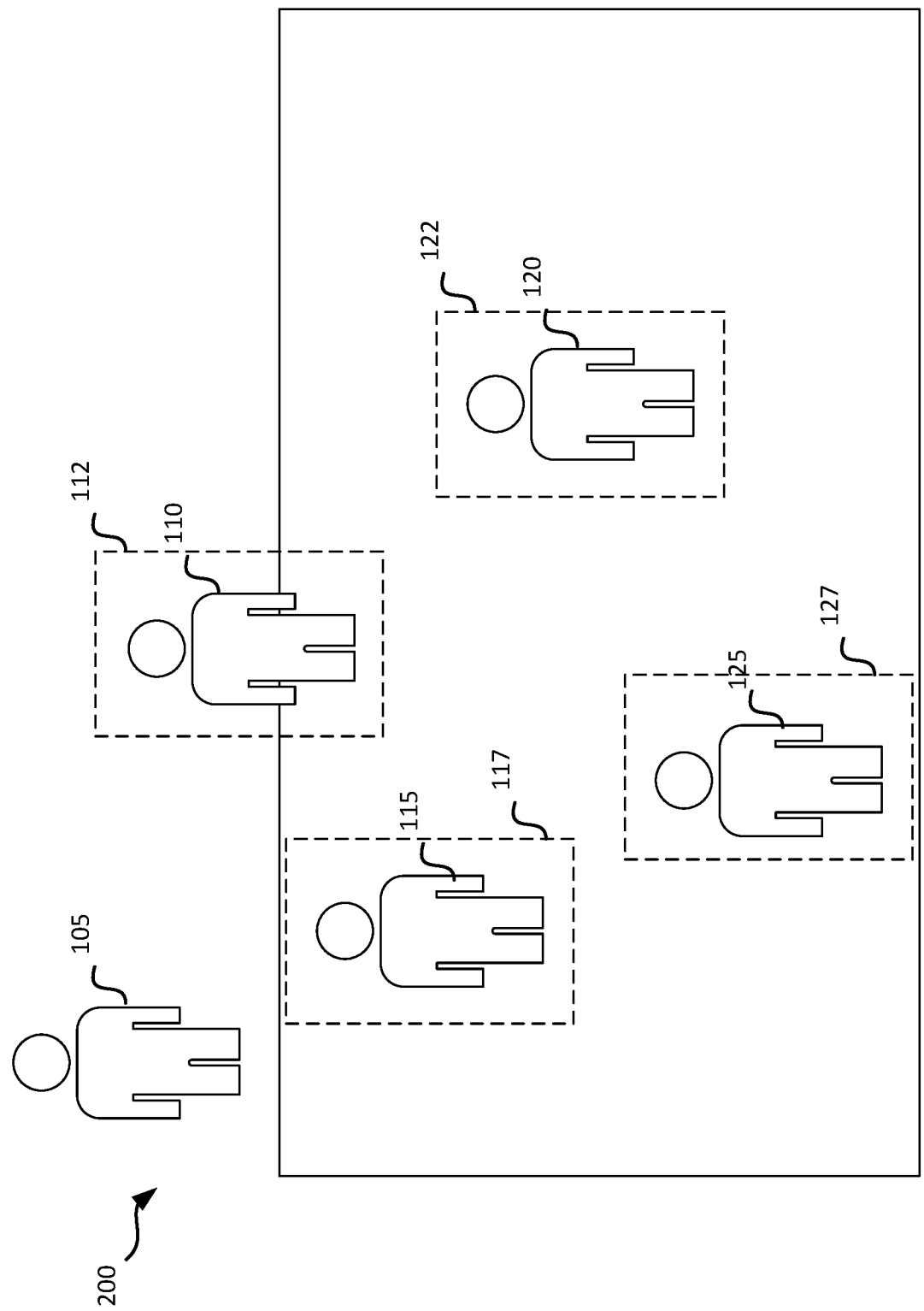
FIG. 2 shows examples of bounding boxes, in accordance with some implementations.

FIG. 2 shows examples of bounding boxes, in accordance with some implementations. In some implementations, each of the players in the playing field 150 may be associated with a bounding box which may be rectangular in shape. The bounding box may cover the entire outline of a player as the player appears in the frame. For example, the player 110 is associated with the bounding box 112, the player 115 is associated with the bounding box 117, the player 120 is associated with the bounding box 122, and the player 125 is associated with the box 127.

In some implementations, the size of a bounding box may vary depending on a posture of a player. For example, the bounding box for a player may be larger when the player is in a standing position and may be smaller when the player is in a sitting position. For some implementations, the player detecting and tracking module 520 may be configured to keep track of the bounding boxes associated with each of the players in the playing field 150. For example, this may help with identifying a bounding box associated with a player with possession of a play object. In some implementations, a bounding box may not be visible to the viewers.

Figure 3:
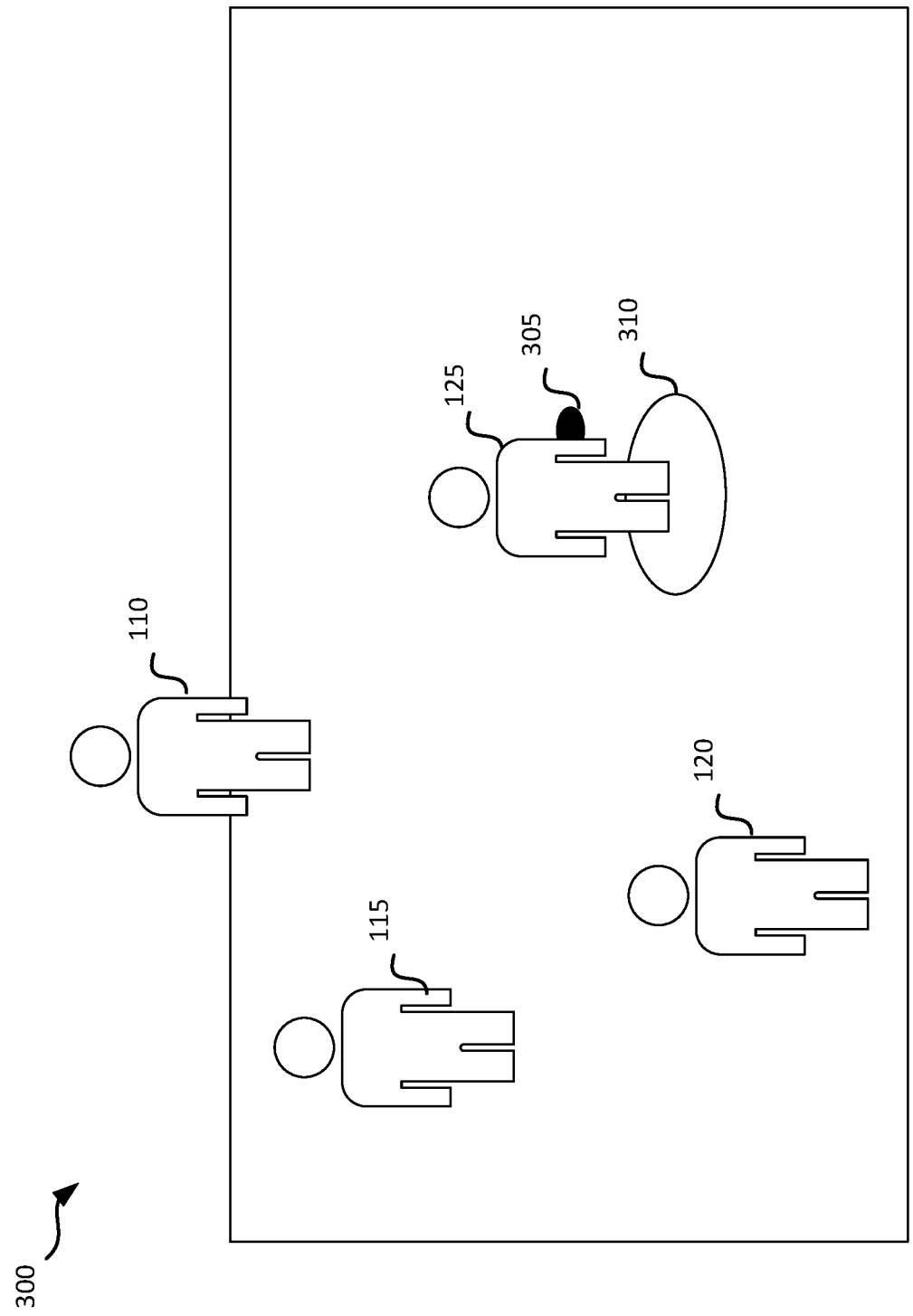
FIG. 3 shows an example of a player with a visualization emphasis object, in accordance with some implementations.

FIG. 3 shows an example of a player with a visualization emphasis object, in accordance with some implementations. In diagram 300, the player 125 is shown with the play object 305. In some implementations, a human operator may assist in identifying a player who has possession of the play object 305. For example, the human operator may click on the bounding box of a player to indicate that the player has possession of the play object 305. The human operator may also assist in identifying when the play object 305 is transferred from one player to another player. The feedback generated by the human operator may then be used to determine the player to place the visualization emphasis object.

In some alternative implementations, a carrier identifying module 535 (shown in FIG. 5) may be used to identify a player with a play object 305. Different techniques may be used to implement the carrier identifying module 535. When a player with the play object 305 is identified, a visualization emphasis object 310 may be generated and may be placed at or near a location of the player 125. It may be noted although the play object 305 is illustrated to be connected to a hand of the player 125, the position of the play object 305 may be anywhere near the player 125 that has possession or is expected to have possession of the play object 305. For example, the player 125 may be a receiver in a football game and may be associated with a visual emphasis object 310 while the ball is in the air and near the player 125.

The visualization emphasis object 310 may have a shape of an ellipse, or it may have any other shape that helps viewers to easily identify a player with the play object 305. In some implementations, the size of a visualization emphasis object 310 may vary depending on the size of the bounding box associated with the player with the play object 305. For example, the size of the visualization emphasis object 310 may be larger when the height of the bounding box is larger, and the size of the visualization emphasis object 310 may be smaller when the height of the bounding box is smaller. In some implementations, the visualization emphasis object 310 may be located at a center location of the base of the bounding box. In some implementations, the visualization emphasis object 310 may be placed on a field ground plane. This may cause portions of the visualization emphasis object 310 to be blocked and not visible, as shown in FIG. 3.

Figure 4:
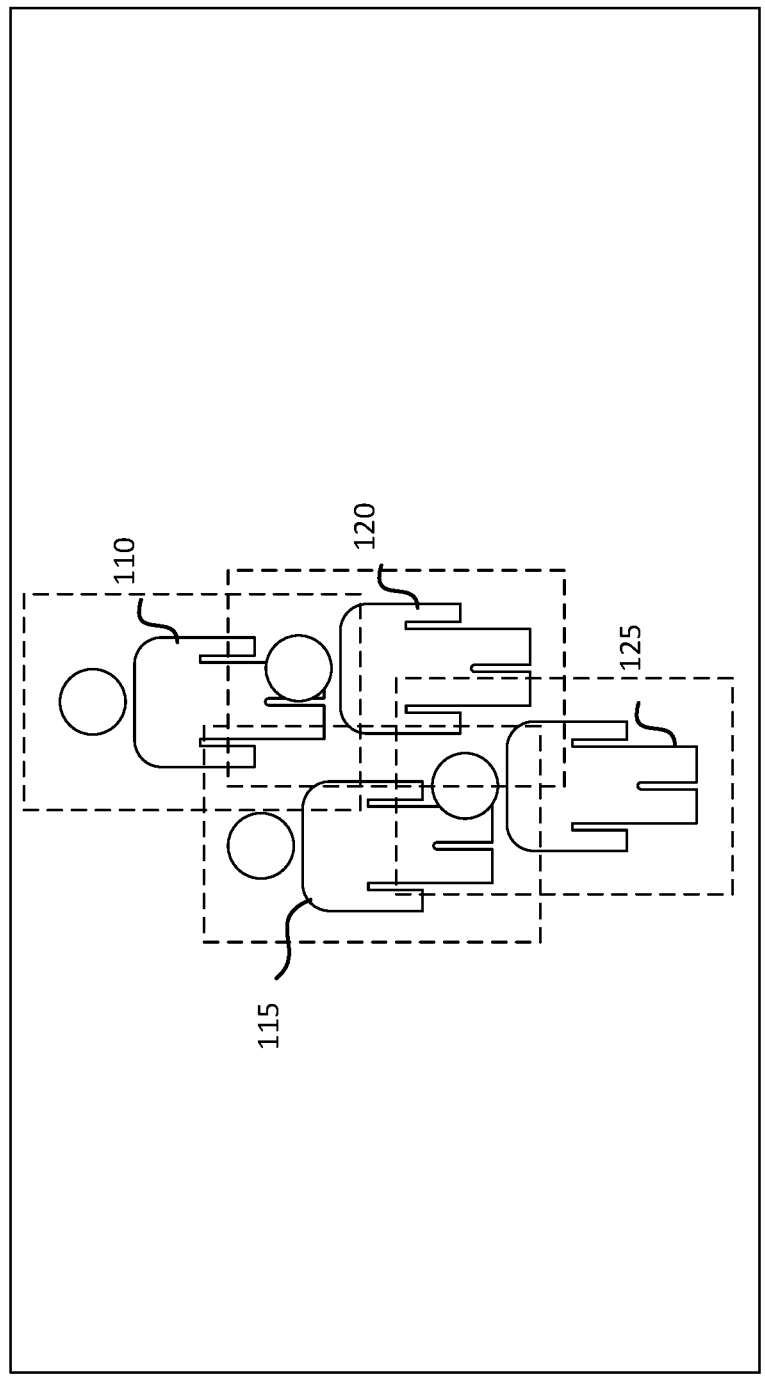
FIG. 4 shows an example of multiple players in or near the same location, in accordance with some implementations.

FIG. 4 shows an example of multiple players in or near the same location, in accordance with some implementations. In some implementations, once the visualization emphasis object 310 is placed on a player, the visualization emphasis object 310 may remain with the same player through multiple frames until the carrier identifying module 535 indicates that the play object 305 has changed hands from one player to another player. In some implementations, when multiple players are positioned in or near a location, occlusion of objects may occur. It may be difficult to place a visualization emphasis object on a player with the ball without causing confusion as to which player has possession of the play object 305. For example, as shown in diagram 400, all four players 110, 115, 120 and 125 are located in approximately the same location. In this situation, the visualization emphasis object may not be visible.

Figure 5:
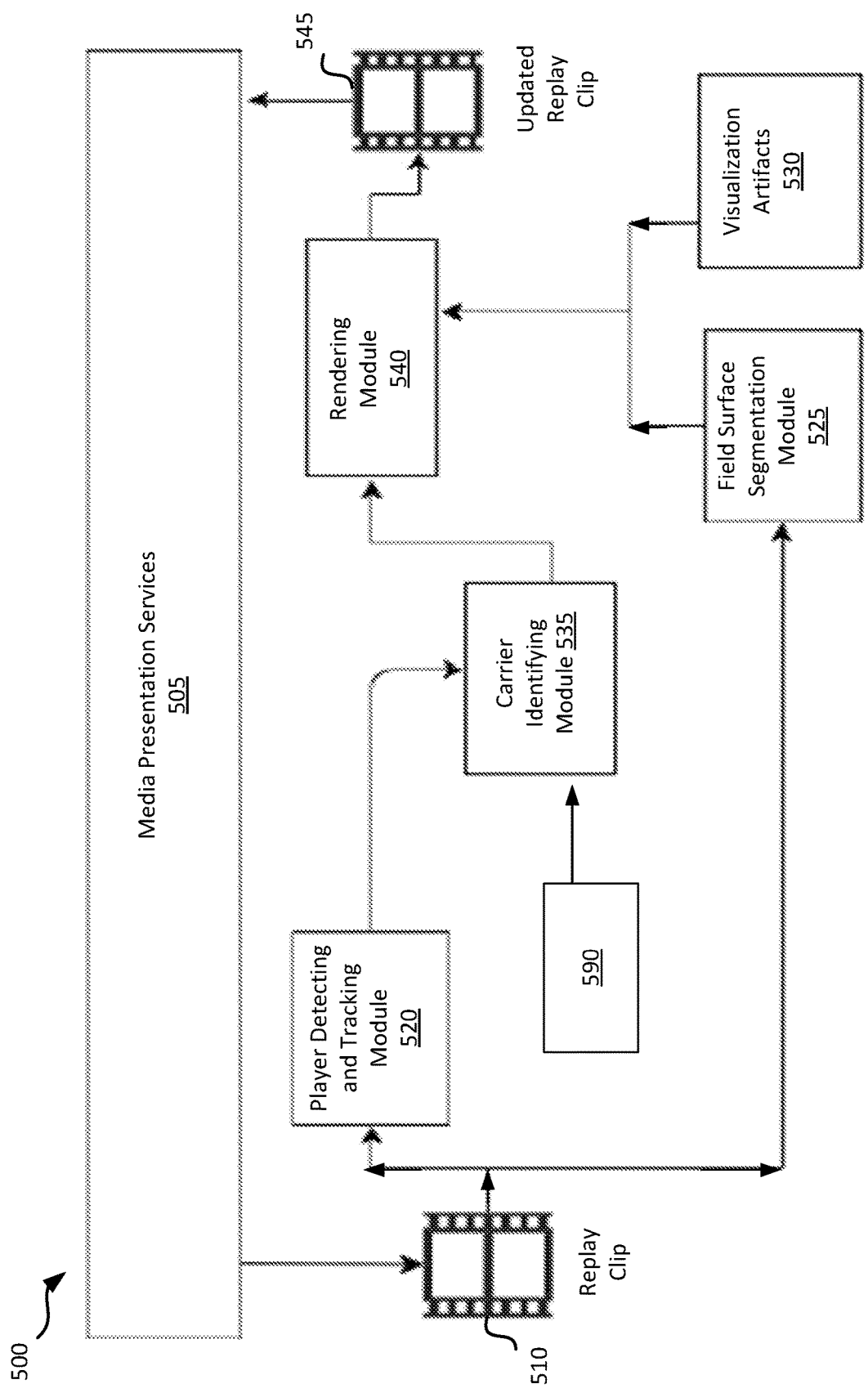
FIG. 5 shows an example player visualization emphasis system, in accordance with some implementations.

FIG. 5 shows an example player visualization emphasis system, in accordance with some implementations. The player visualization emphasis system in diagram 500 may include media presentation services 505 configured to provide video clips that may be enhanced with player visualization emphasis features. The video clips may include replay clip 510. For example, the media presentation services may be X-ray Media Services of Prime Video provided by Amazon.com of Seattle, Washington. The replay clip 510 may be processed by the player detecting and tracking module 520 and the field surface segmentation module 525.

The player detecting and tracking module 520 may be configured to perform player detection based on Computer Vision (CV) based multi object tracking (MOT) of all the players visible in each frame of the replay clip 510. In some implementations, the tracking operations performed by the player detecting and tracking module 520 may use a deep-learning based algorithm referred to as DeepSORT (SORT: Simple Real time Tracker). In some implementations, the detecting operations performed by the player detecting and tracking module 520 may be based on Common Objects in Context (COCO) datasets. COCO is a large-scale object detection, segmentation, and captioning dataset, and images in the dataset may be everyday objects captured from everyday scenes. The detection operations may be trained using YOLOv3 model (YOLO: You Only Look Once). In some implementations, the COCO dataset may be finetuned using a custom dataset for a particular sporting event such as, for example, football. The player detecting and tracking module 520 may use motion and appearance features extracted from the bounding boxes to perform frame by frame data association and track generation.

The field surface segmentation module 525 may be configured to identify the pixels associated with the playing field. The field surface segmentation module 525 may be configured to operate with the visualization artifacts 530 and use texture and color-based methods to perform a pixel level field surface segmentation. For example, the pixel level field surface segmentation may be used so that the visualization emphasis object can be visualized on the field surface pixels. Other pixels that belong to players, officials or any other object on the playing field may not be changed while rendering. This may enable providing an effect that since the visualization emphasis object is on a field ground plane, the visualization emphasis object may get occluded by any other objects on the playing field. In some implementations, the field segmentation for a single frame may include image size reduction which reduces image size to a smaller size such as, for example, 256×456 pixels such that the operations can be computationally efficient while still capturing the unique color and texture features of the playing field. The field segmentation may further include texture filtering which uses entropy-based texture filtering and Otsu thresholding to create a rough estimate of the field surface based on texture, color conversion which converts the pixels to CIELab color space as defined by the International Commission on Illumination for measuring object color where distances have a perceptual meaning, and color-based segmentation which performs color-based segmentation using a Gaussian Mixture Model (GMM). The number of clusters used may be based on accuracy and efficiency constraints. Using larger number of clusters may result in a larger convergence time for the Expectation Maximization (E-M) algorithm used to train the GMM. The field segmentation may combine texture and color-based segmentations to identify the color clusters which have intersection with the texture-based field segmentation, and field pixel identification which use pixels from the previously identified color labels as field pixels. Data generated by the field surface segmentation module 525 may be used to determine how to place the visualization emphasis object 310 on a player with the play object 305. In some implementations, the field surface segmentation module 525 may be configured to extract the static graphics components present in the broadcast stream such as, for example, score boards and logos. This may be performed based on an assumption that the pixels associated with those static graphics components don't change as significantly as other pixels. The extracted static graphics components may be used to identify areas that the visualization emphasis object 310 should not overlay. In some implementations, the field surface segmentation module 525 may be implemented using deep learning-based methods involving semantic segmentation models such as Mask R-CNN (regional convolutional neural network) and DeepLabv3.

In some implementations, multiple players on the playing field may be highlighted based on the result of the player detecting and tracking module 520. For example, the players on the same team and on the playing field with the player having the possession of the play object 305 may be highlighted using a different visualization emphasis object (e.g., a square) from the visualization emphasis object (e.g., an ellipse) placed on the player with the play object 305. In some implementations, one or more players of interest may be highlighted. The one or more players may be on the same team or on different teams. For example, the one or more players may be involved in a play that the viewers may be interested in viewing as the play develops. For example, the selection of the one or more players to be highlighted may be based on prior knowledge of the play.

In some implementations, the visualization emphasis object 310 may be generated based on feedback provided by a human operator. The feedback may include identification of a player having possession of the play object 305. The feedback may include timestamp information. For example, the timestamp information may indicate that the player 125 (shown in FIG. 3) has possession of the play object 305 for 5 seconds from time "t1" to time "t2". In some implementations, the timestamp information provided by the human operator may be used to maintain the visualization emphasis object 310 on the player with the play object 305. The feedback provided by the human operator may also include identification of when the play object 305 is transferred from one player to another player. For example, the human operator may select a bounding box associated with another player to indicate that the play object 305 is transferred to this other player. This may cause the visualization emphasis object to be placed on a different player. In some implementations, the feedback provided by the human operator may further include identification of players being on the same team with the player having the possession of the play object 305 or multiple players on both teams. In some implementations, the players identified by the human operator may be highlighted so that they may be more visible than the other players. In some implementations, the carrier identifying module 535 may be used to perform the operations of identifying a location of the play object 305 using radio frequency identification (RFID). For example, the carrier identifying module 535 may be configured to use a RFID tag associated with the play object 305 to determine the location of the play object 305. The combination of the location of the play object 305 and the location of the players on the playing field based on their associated bounding boxes may be used by the carrier identifying module 535 to identify a player with the playing object 305. A RFID tracking system 590 may be used to track the location of the play object 305. The tracking information received from the RFID tracking system 590 may be used by the carrier identifying module 535 to perform its operations.

The rendering module 540 may be configured to receive location of a center of a visualization emphasis object, a height of a bounding box, and parameter that may be used to scale the size of the visualization emphasis object with respect to the height of the bounding box. The rendering module 540 may be configured to blend the visualization emphasis object on the field surface for jitter removal and smoothing. In some implementations, the Savitzky-Golay filtering may be used for noise reduction along with an exponential smoothing. The blending of the visualization emphasis object may be made directly onto each of the frames of a replay clip 510. The rendering module 540 may be configured to generate the visualization emphasis object (e.g., an ellipse) in a color that may enable the visualization emphasis object to be visible when used with the color of the field surface. The rendering module 540 may also be configured to use a perspective transformation such as, for example, homography transformation, from the field coordinates to the image coordinates so that the visualization emphasis object may appear to be realistic on the field surface. The rendering module 540 may blend the visualization emphasis object 310 with the replay clip 510 to generate the updated replay clip 545. The updated replay clip 545 may then be transmitted back to the media presentation services 505 and may be presented as an option for playback with the visualization emphasis features.

Figure 6:
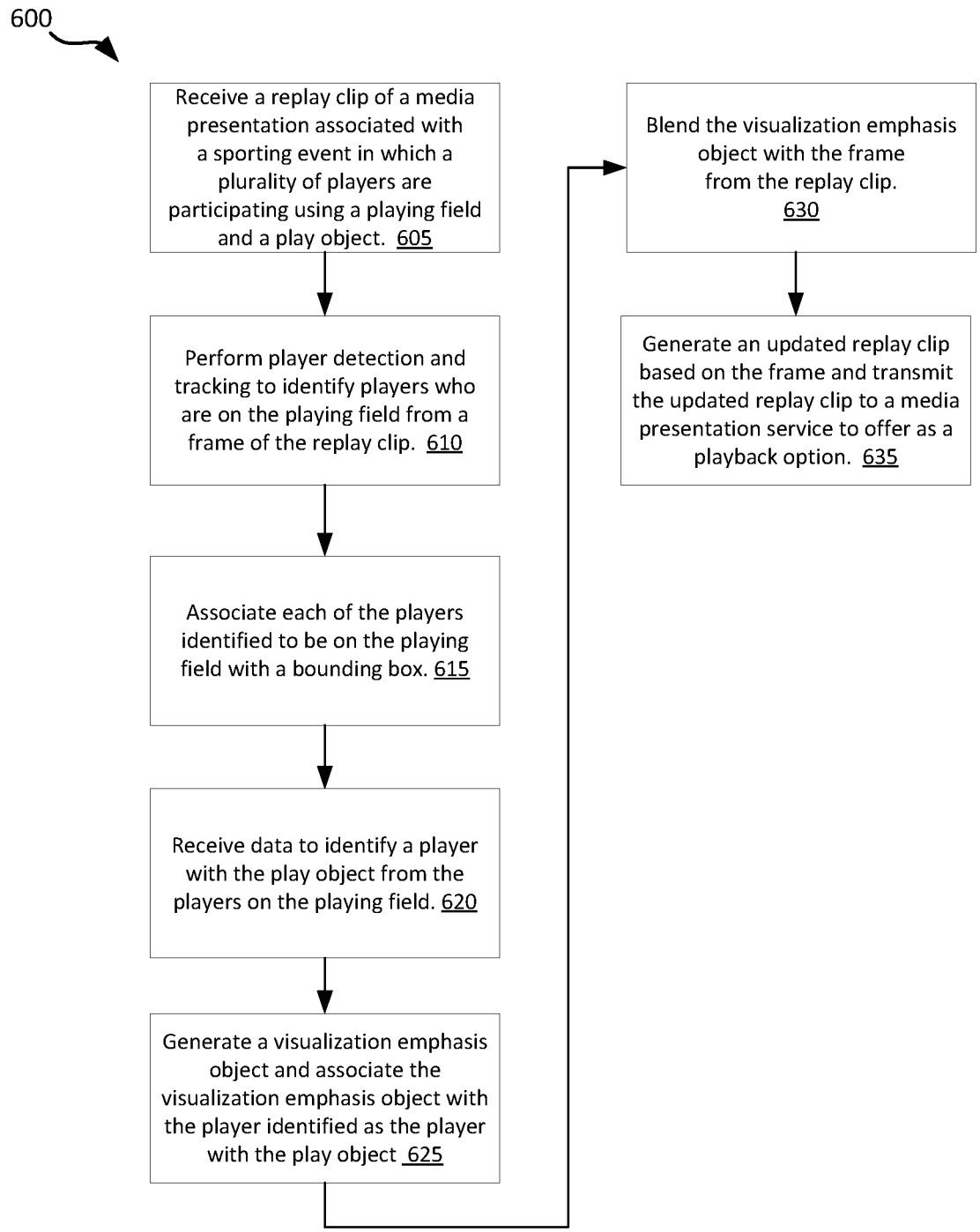
FIG. 6 shows an example process that may be used to generate the player visualization emphasis object feature, in accordance with some implementations.

FIG. 6 shows an example process that may be used to generate the player visualization emphasis feature, in accordance with some implementations. The process 600 may include operations performed by the modules shown in FIG. 5. At block 605, a replay clip of a media presentation associated with a sporting event may be received from a media presentation service. The sporting event may be participated in by a plurality of players using a playing field and sharing a play object. The replay clip may be associated with a live streaming of the sporting event. At block 610, a frame from the replay clip may be analyzed. The analysis may be performed by a player detecting and tracking module 520. The detection of the players may be limited to the players on the playing field. The tracking operations of the player detecting and tracking module 520 may track the players among multiple frames of the replay clip. It may be possible that a player may be on the playing field for a certain period of time and may be off the playing field completely after that. The tracking operations therefore may be configured to stop keeping track of the players who are no longer on the field.

At block 615, a bounding box may be generated and associated with each of the players on the playing field. This may include the players who are detected to be partially on the field but who have been determined to be on the playing field based on, for example, the position of the areas where the players stand relative to the playing field. At block 620, data identifying a player on the playing field who has possession of the play object may be received. The data may be generated by a human operator. As an alternative, the data may be generated by the carrier identifying module 535. In some implementations, operations of the carrier identifying module 535 may be implemented using the RFID technique described above with FIG. 5. In some implementations, other available techniques for associating the play object 305 with a player on a playing field may also be used.

At block 625, the visualization emphasis object may be generated. The visualization emphasis object may be associated with the player identified as having possession of the play object. In some implementations, the visualization emphasis object may be in the shape of an ellipse. In some implementations, the size of the visualization emphasis object may vary depending on the height of the bounding box associated with the player with the play object 305. In some implementations, there may only be one player with the visualization emphasis object at a time. When possession of the play object changes from the first player to the second player, the second player will be associated with the visualization emphasis object. At block 630, the visualization emphasis object may be blended with the frame such that the player with the play object in the frame will be associated with the visualization emphasis object. The operations at block 630 may correspond to the operations described with the rendering module 540 (shown in FIG. 5). The operations at block 630 may receive input from a field surface segmentation module 525 which may be configured to identify pixels on the playing field over which the visualization emphasis object 310 may overlay.

At block 635, an updated replay clip may be generated. The updated replay clip may be transmitted to the media presentation services and may be presented to the viewers for viewing as a playback option. In some implementations, the replay clip shown in block 605 may be received shortly (e.g., a few seconds) after it is recorded from a live sporting event. The replay clip may then be processed by the operations in blocks 610 to 630, and the updated replay clip may be generated in block 635. The updated replay clip may then be transmitted to the media presentation service and be offered as a review or playback option shortly thereafter. A viewer may therefore be able to replay a video clip that was recorded seconds before and be able to enjoy a better viewing experience with the visualization emphasis feature.

Figure 7:
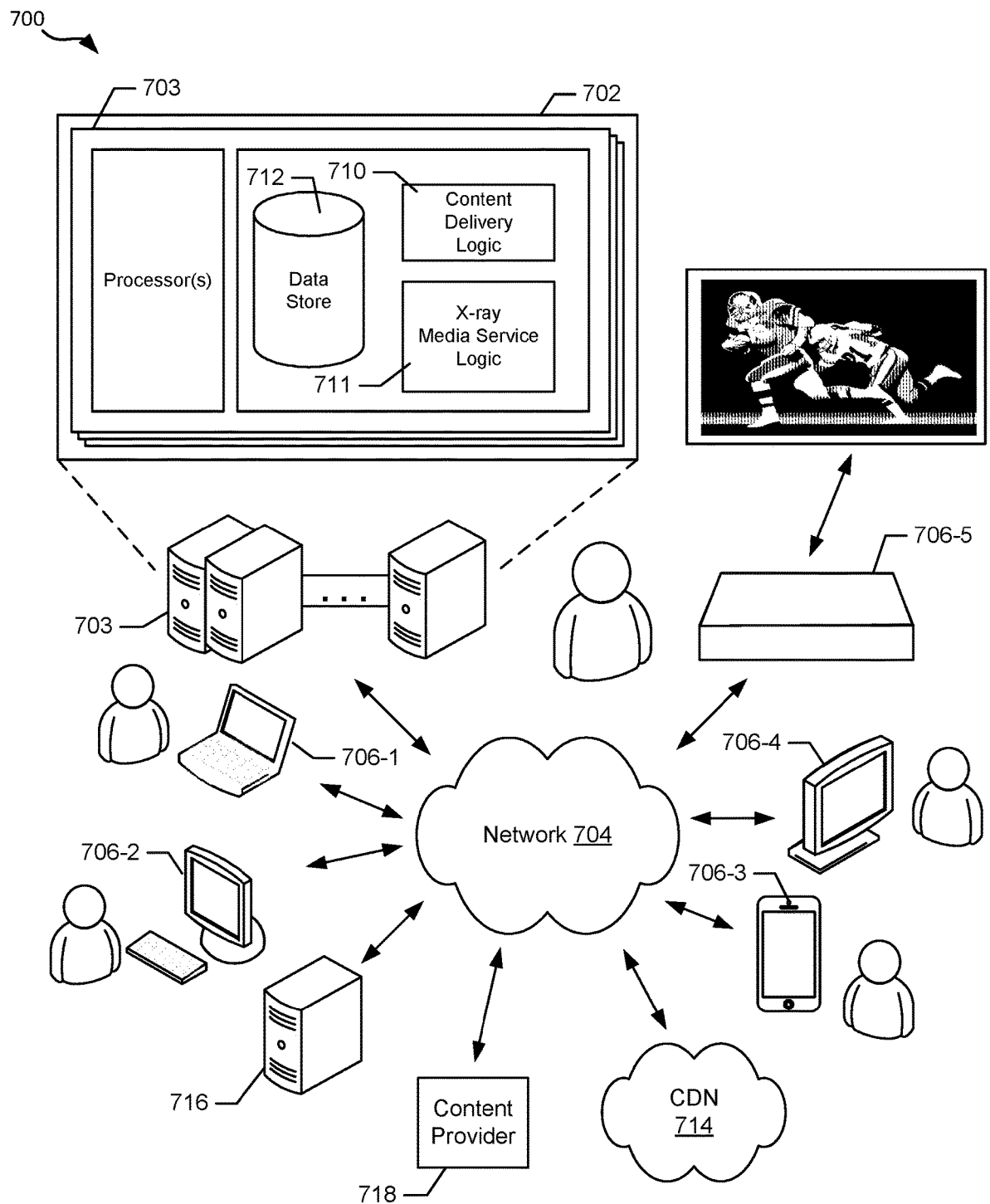
FIG. 7 shows a diagram of an example computing environment that may be used with some implementations.

FIG. 7 shows a diagram of an example computing environment that may be used with some implementations. Diagram 700 includes a computing environment in which a video content service 702 provides video content via network 704 to a variety of client devices (706-1 through 706-5) in accordance with the techniques described herein. The video content may include live or broadcast content or video-on-demand (VOD) content. In various implementations, the video content may be a video presentation of a live event (e.g., a livestream, broadcast, and/or camera feed of an ongoing live event and/or a recording of a partially or fully-completed event which may also be referred to as formerly-live event). Content service 702 may conform to any of a wide variety of architectures such as, for example, a services platform deployed at one or more co-locations, each implemented with one or more servers 703. Network 704 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 706 may be any suitable device capable of connecting to network 704 and consuming content provided by service 702. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 702. Alternatively, such resources may be independent of content service 702, e.g., on a platform under control of a separate provider of computing resources with which content service 702 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 702 is described as if it is integrated with the platform(s) that provides both broadcast content and VOD-style content to client devices. However, it will be understood that content service 702 may provide access to content in conjunction with one or more content delivery networks (e.g., CDN 714) that may or may not be independent of content service 702. In addition, the source(s) of one or both of the broadcast and VOD-style content may or may not be independent of content service 702 (e.g., as represented by content provider server 716, and live content provider 718). The range of variations known to those of skill in the art are contemplated to be within the scope of this disclosure.

Some of the implementations enabled by the present disclosure contemplate logic resident on the client devices consuming video content from content service 702; such logic might be configured to handle, for example, requesting smaller chunks of subtitle files. Such logic might be part of an existing algorithm or module on the client device or implemented to work in conjunction with such an algorithm or module.

It should also be noted that implementations are contemplated in which, in addition to content delivery logic 710 (which facilitates various aspects of content delivery to client devices 706), content service 702 may include other types of logic, e.g., X-ray media service logic 711 that facilitates providing additional material such as bonus content for video content. For example, the bonus content may include video clips that include blended visualization emphasis objects for players in sporting events. Although the X-ray media service logic 711 is shown to be associated with the content service 702, it may be possible that the X-ray media service logic 711 is associated with the content service 702 and/or a third-party service.

In addition to providing access to video content, content service 702 may also include a variety of information related to the video content (e.g., non-burned-in subtitle information, and other associated metadata and manifests in data store 712 to which service 702 provides access). Alternatively, such information associated with and/or about the content, as well as the content itself may be provided and/or hosted by one or more separate platforms, e.g., CDN 714. It should be noted that, while logic 710 and 711, and data store 712 are shown as integrated with content service 702, implementations are contemplated in which some or all of these operate remotely from the associated content service, and/or are under the control of an independent entity. From these examples, those of skill in the art will understand the diversity of use cases to which the techniques described herein are applicable.

Although implementations have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain implementations could include, while other implementations do not include, certain features, elements, and/or steps. Thus, such conditional language is not generally intended to imply that features, elements, and/or steps are in any way required for one or more implementations or that one or more implementations necessarily include logic for deciding, with or without user input or prompting, whether these features, elements, and/or steps are included or are to be performed in any particular implementation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method comprising:
   receiving a video clip associated with a sporting event in which a plurality of players are participating using a playing field, the sporting event also having a play object associated therewith;
   detecting people included in a frame of the video clip;
   detecting players from among the people included in the frame of the video clip;
   identifying players who are on the playing field from among the detected players;
   associating each of the players identified to be on the playing field with a rectangular bounding box that provides an outline of each of the players as the players appear in the frame of the video clip;
   receiving data identifying a player from the players on the playing field to have possession of the play object;
   generating a visualization emphasis object having a size proportional to a height of the bounding box associated with the player having possession of the play object;
   positioning the visualization emphasis object at a center of a base of the bounding box associated with the player having possession of the play object;
   blending the visualization emphasis object with the frame to generate an updated video clip, wherein the blending of the visualization emphasis object with the frame is performed using perspective transformation, wherein the updated video clip includes one or more frames of the video clip; and
   transmitting the updated video clip to a media presentation service to be offered as a replay option of the video clip.

2. The method of claim 1, wherein the blending of the visualization emphasis object with the frame includes determining a color for the visualization emphasis object.

3. The method of claim 1, wherein the positioning the visualization emphasis object is performed using field surface segmentation.

4. The method of claim 1, wherein the visualization emphasis object is placed on a field ground plane.

5. A computer-implemented method comprising:
receiving a video clip associated with a sporting event in which a plurality of players are participating using a playing field, the sporting event having a play object associated therewith;
detecting people included in a frame of the video clip;
detecting players from among the people included in the frame of the video clip;
identifying players who are on the playing field from the detected players;
associating each of the players identified to be on the playing field with a rectangular bounding box that provides an outline of each of the players as the players appear in the frame of the video clip;
receiving data identifying which player from among the players on the playing field has possession of the play object in the frame of the video clip;
generating a visualization emphasis object having a size proportional to a height of the bounding box associated with the player having possession of the play object;
positioning the visualization emphasis object at a center of a base of the bounding box associated with the player having possession of the play object; and
blending the visualization emphasis object with the frame to generate an updated video clip, wherein the blending of the visualization emphasis object with the frame is performed using perspective transformation, wherein the updated video clip includes one or more frames of the video clip.

6. The method of claim 5, further comprising:
transmitting the updated video clip to a media presentation service to be offered as a playback option.

7. The method of claim 5, wherein the blending of the visualization emphasis object with the frame includes determining a color for the visualization emphasis object to enable the visualization emphasis object to be visible relative to a surface of the playing field.

8. The method of claim 7, wherein positioning of the visualization emphasis object on the playing field is performed using field surface segmentation.

9. The method of claim 5, wherein the visualization emphasis object is placed on a field ground plane.

10. The method of claim 5, wherein the visualization emphasis object is not displayed in one or more frames of the updated video clip.

11. The method of claim 5, wherein a portion of the visualization emphasis object is occluded by players, officials, objects, or any combination thereof on the playing field.

12. The method of claim 5, further comprising identifying which player from the players on the playing field has possession of the play object in the frame.

13. A system comprising:
memory configured to store computer-executable instructions; and
at least one computer processor configured to access the memory and execute the computer-executable instructions to:
receive a video clip associated with a sporting event participated by a plurality of players using a playing field and sharing a play object;
detect people included in a frame of the video clip;
detect players from among the people included in the frame of the video clip;
identify players who are on the playing field from the detected players;
associate each of the players identified to be on the playing field with a rectangular bounding box that provides an outline of each of the players as the players appear in the frame of the video clip;
receive data identifying which player from the players on the playing field has possession of the play object in the frame of the video clip;
generating a visualization emphasis object having a size proportional to a height of the bounding box associated with the player having possession of the play object;
positioning the visualization emphasis object at a center of a base of the bounding box associated with the player having possession of the play object;
and
blend the visualization emphasis object with the frame to generate an updated video clip, wherein blending of the visualization emphasis object with the frame comprises a perspective transformation of the visualization emphasis object, wherein the updated video clip includes one or more frames of the video clip.

14. The system of claim 13, further comprising instructions to:
transmit the updated video clip to a media presentation service to be offered as a playback option.

15. The system of claim 13, wherein the instructions to blend the visualization emphasis object with the frame includes instructions to determine a color for the visualization emphasis object to enable the visualization emphasis object to be visible with a surface of the playing field.

16. The system of claim 15, wherein field surface segmentation is used to determine a location on the playing field to place the visual emphasis object.

17. The system of claim 13, wherein the visualization emphasis object is placed on a field ground plane.

18. The system of claim 13, wherein the visualization emphasis object is not displayed in one or more frames of the updated video clip.

19. The system of claim 13, wherein a portion of the visualization emphasis object is occluded by players, officials, objects, or any combination thereof on the playing field.

20. The system of claim 13, wherein the computer-executable instructions include further instructions to identify which player from the players on the playing field has possession of the play object in the frame.

* * * * *